(12) United States Patent
Pervez (10) Patent No.: US 10,982,660 B2
(45) Date of Patent: Apr. 20, 2021

(54) GRAVITY OSCILLATING SYSTEM

(71) Applicant: Shakeel Ahmed Pervez, Watford (GB)

(72) Inventor: Shakeel Ahmed Pervez, Watford (GB)

( * ) Notice: Subject to any disclaimer, the term of this patent is extended or adjusted under 35 U.S.C. 154(b) by 67 days.

(21) Appl. No.: 16/340,656

(22) PCT Filed: Dec. 16, 2015

(86) PCT No.: PCT/GB2015/000325
§ 371 (c)(1),
(2) Date: Apr. 9, 2019

(87) PCT Pub. No.: WO2017/103552
PCT Pub. Date: Jun. 22, 2017

(65) Prior Publication Data
US 2019/0301437 A1  Oct. 3, 2019

(51) Int. Cl.
| F03G 7/08 | (2006.01) |
| H02K 7/18 | (2006.01) |
| F03G 3/00 | (2006.01) |
| F16H 21/40 | (2006.01) |
| H02K 7/075 | (2006.01) |

(52) U.S. Cl.
CPC .............. *F03G 3/00* (2013.01); *F16H 21/40* (2013.01); *H02K 7/075* (2013.01); *H02K 7/1853* (2013.01); *F03G 2730/07* (2013.01)

(58) Field of Classification Search
CPC ........ F03G 3/00; F03G 2730/07; F16H 21/40; H02K 7/075; H02K 7/1853
See application file for complete search history.

(56) References Cited

U.S. PATENT DOCUMENTS

| 1,136,911 A * | 4/1915 | Kiger ................. F03G 3/00 185/33 |
| 4,238,968 A * | 12/1980 | Cook .................. F03G 3/00 74/84 R |
| 10,060,408 B2 * | 8/2018 | Vamvas ............. H02K 7/1853 |
| 10,533,531 B2 * | 1/2020 | Vamvas ............. H02K 7/1823 |

(Continued)

FOREIGN PATENT DOCUMENTS

| GB | 2501737 A | 11/2013 |
| GB | 2527102 A | 12/2015 |

*Primary Examiner* — Tulsidas C Patel
*Assistant Examiner* — Thomas K Quigley
(74) *Attorney, Agent, or Firm* — Invention To Patent Services; Alex Hobson (57) ABSTRACT

A gravity oscillating system which comprises a looped and suitably substantially circular track around which a heavy mass such as a ball travels in use, the track being supported from above or below to oscillate up and down as the ball travels around the track, and there being a power transfer mechanism linked to the track to be moved by the track as the track oscillates, the power transfer mechanism being linked to an electrical generator/dynamo whereby the movement is used to generate electrical energy and wherein the system has an oscillating electromagnetic drive comprising a plurality of electromagnets in an array around the track and which are successively momentarily energized to urge each successive part of the track around the track in a direction, upwards or downwards, to cause the track to dip down ahead of the rolling mass, without the drive contacting the track.

23 Claims, 7 Drawing Sheets

(56) References Cited

U.S. PATENT DOCUMENTS

| | | | |
|---|---|---|---|
| 2009/0183951 A1* | 7/2009 | Fiala | B64G 1/285 |
| | | | 185/27 |
| 2009/0273188 A1* | 11/2009 | McKinney | F03G 7/08 |
| | | | 290/53 |
| 2013/0047754 A1 | 2/2013 | Condric | |
| 2017/0009734 A1* | 1/2017 | Vamvas | H02K 7/1853 |
| 2018/0372061 A1* | 12/2018 | Vamvas | F03B 13/22 |

* cited by examiner

GRAVITY OSCILLATING SYSTEM

CROSS REFERENCE TO RELATED APPLICATIONS

This application is a national stage entry of PCT application no. PCT/GB2015/000325 having an international filing date of Dec. 16, 2015.

FIELD OF THE INVENTION

The present invention concerns a gravity oscillating system, having a weight that falls under gravity and where part of the system has an oscillating motion.

BACKGROUND OF THE INVENTION

It is an object of the present invention to provide an improved gravity oscillating system, where part of the system oscillates or gyrates due to the force of gravity and that may be used for a wide range of different applications such as, for example, as an educational tool, a toy, a means for managing electrical power or combinations of these.

Gravity-using oscillating systems have been proposed in the past and include the system of U.S. Pat. No. 244,799 which concerns the use of a revolving circular tread carrying both a massive ball and a horse or other beast of burden both to travel around the circular tread in procession and which is balanced on a fulcrum to oscillate and coupled by chains to pistons of a pumping system to raise water or perform other work. The weight and motion of the horse directly contacting and standing on and moving around the tread is the prime mover of the system and the ball as it rolls is intended to supplement the energy from the prime mover. The massive ball is shackled to the apparatus and the beast of burden, and is not free, so that it is constrained to roll around the circular tread a substantially fixed distance from the beast of burden in attempt to supplement the kinetic energy from the horse. This system fails to substantially augment the power of the horse as the horse's momentum is for a large part of the time at odds with the momentum of the ball the two opposing each other rather than augmenting each other.

U.S. Pat. No. 5,048,356 proposes a gravity using oscillating system that comprises a circular platform supported centrally on a fulcrum to wobble/oscillate and in which a trolley is shackled by an arm to a central axle through the platform. As the trolley rolls around the circumferential perimeter of the platform it will turn the axle and thence a generator. The trolley is not free. The platform is also constrained in its movement by cables that are attached to opposing points on the perimeter of the platform to alternately pull the platform down there. The cables are paid out from a winching mechanism and the turning of the winching mechanism is driven by electric motor which may be energized by the generator.

US patent application US 2013047754 proposes a gravity-using oscillating system that comprises a circular track supported centrally on a fulcrum to wobble/oscillate and in which an electric motor driven heavy trolley is shackled by an arm to a central axle through the circular track. The trolley here is shackled by the arm, not free-wheeling and constrained by its electric motor drive. The trolley/heavy mass may be un-wheeled but supported and driven around the track by mag-lev instead but it is not free-rolling/free-moving around the track.

None of the afore-mentioned systems operates efficiently and effectively to optimize energy recovery relative to energy use. There is a need for a better gravity-using oscillating system that reduces the energy inputs and losses of the system.

SUMMARY OF THE INVENTION

According to a first aspect of the present invention there is provided a gravity oscillating system or generator system which comprises a looped track around which a mass travels freely in use, the track being supported from above or below to oscillate up and down as the mass travels around the track, and there being a power transfer mechanism linked to the track to be moved by the track as the track oscillates, the power transfer mechanism being linked to an electrical generator/dynamo whereby the movement is used to generate electrical energy and wherein the system has an oscillating electromagnetic drive comprising a plurality of electromagnets in an array around the track and which are successively momentarily energized to urge the successive part of the track around the track in a direction, upwards or downwards to cause the track to dip down ahead of the moving mass, without the drive contacting the track.

We have found that by a system using a freely moving mass and with non-contact rapid small adjustments of tilt of successive sections of the track around the track's circumference the energy inputs and losses of the system can be minimised and the system can provide considerable improvements in operating efficiency and effectiveness over the existing systems.

In a particularly preferred embodiment the electro-magnetic drive alternately urges a part of the track downwardly ahead of the moving mass running around the track. Suitably each electromagnet is below the track and attracts and pulls the track downwardly at its location.

The track, or an extension of the track—eg a below-lying plate/platform, has at least one counterpart/co-operating magnet or magnetisable element, preferably a permanent magnet. The electro-magnet arrangement is suitably provided as an annular array and preferably a plurality of counterpart magnets or magnetisable elements provided on the track or an extension of the track (eg underside and/or radially inner part of plate where the track is at the circumferential perimeter of a circular plate). The track or track extension may conversely but less preferably carry the electromagnet arrangement/array and the counterpart/cooperating magnet or magnetisable element be on the underlying structure/plate or platform.

The operation of each electromagnet suitably subject to automated control whereby the electromagnet is on for a brief period or pulse suitably sufficient only to assist movement of the track around to the region of influence of the next successive electromagnet in the array before that next electromagnet is switched on for a brief period instead and so on.

An arrangement of micro-switches is preferably provided for the automated control of the electromagnets. The apparatus may have a control processor and may in some embodiments have sensors to sense position of the track and/or ball and/or sense rate of oscillation or gyration.

The moving mass is particularly preferably a rolling mass and is preferably a ball. The looped track is a loop, or ring, preferably being substantially circular, but could be a more elongate oblong form with rounded ends, for example. To constrain and guide a rolling mass the track preferably comprises a sidewall and/or guide rail at least around its (radially) outer perimeter.

In an alternative embodiment the moving mass may comprise a weight on an arm or plate that is mounted to revolve around a central/fulcrum axis of the track. The arm or plate is preferably annular and particularly preferably is supported by bearings The weight is preferably demountable from the plate or arm and thereby inter-changeable with heavier or lighter weights.

Preferably the looped or substantially circular track has at its loop centre a universal joint/ball joint and preferably it is at the upper end of an underlying support pillar to support the track from below. The track gyrates. It is suitably supported at an acute angle to horizontal plane so that it rolls on its circumferential perimeter, gyrating around the loop central axis (like a coin that is spinning on the spot prior to lying flat).

Preferably the track is formed at the perimeter of a circular disc, circular plate or an annulus. In one preferred embodiment the track is a ring or torus that encircles the perimeter of a disc or plate that is substantially co-planar with the ring or torus.

The moving mass/ball is suitably massive, suitably being of a weight of 1 kg or more. It suitably considerably exceeds the weight of the track/plate and suitably exceeds the static friction/static inertia of the plate and power transfer mechanism.

In one preferred embodiment the power transfer mechanism comprises a crankshaft.

The power transfer mechanism has crank pins, linkages or pistons that touch a surface of the track or touch or attach to a surface extending from the track (eg underside and/or radially inner part of plate where the track is at the circumferential perimeter of a circular plate) and which pins, connecting rods, linkages or pistons follow the downwards and upwards motion of respective parts of the track. Preferably the pins, connecting rods, linkages or pistons are attached to said surface.

In many preferred embodiments the generator is a linear alternator/linear reciprocating electrical generator. In such cases the power transfer mechanism need not comprise a crank shaft and the electrical generator may be at/coupled to a said pin, connecting rod, linkage or piston, preferably at an end of the pin, connecting rod, linkage or piston.

Where the power transfer mechanism has crank pins, linkages or pistons these are preferably installed to the system extending down below the track at an angle of incline to vertical. The power transfer mechanism particularly preferably has only one crank pin per crank shaft. The power transfer mechanism may comprise a plurality of crank shafts at intervals around the track, each having a respective crank pin.

The system preferably has for each crank pin, linkage or piston at least one end of throw deflector that is configured to assist the crank pin, linkage or piston to move beyond its extreme throw position to complete a cycle of operation. The throw deflector may be a deflecting surface or a magnet and may suitably be an electromagnet that is energized briefly when the crank pin, linkage or piston reaches its extreme throw position to push it to continue the cycle beyond that position. Proximity sensors might be provided on the power transfer mechanism to trigger the throw deflector electromagnet to energize when required.

Preferably there are a pair of end of throw deflecting surfaces for the, or each, crank pin, linkage or piston, one being an upper end of throw deflecting surface for the upper extremity of movement of the crank pin, linkage or piston and the other being a lower end of throw deflecting surface for the lower extremity of movement of the crank pin, linkage or piston. The, or each, end of throw deflecting surface is inclined relative to the vertical plane, and may further be curving, to deflect the crank pin, linkage or piston in the intended direction.

In a preferred arrangement the crank pin, linkage or piston has a shoulder, e.g. on a transverse projection or transverse bar extending laterally/substantially radially outwardly from the crank pin, linkage or piston and which will abut the end of throw deflecting surface. The shoulder or transverse projection preferably comprises a rolling bearing at its tip such as, for example, a roller bearing or ball bearing to follow the guidance of the deflecting surface.

BRIEF DESCRIPTION OF THE DRAWINGS

The A preferred embodiment of the present invention will now be further described, by way of example only, with reference to the accompanying drawing, in which.

DESCRIPTION OF THE PREFERRED EMBODIMENT

Figure 1:
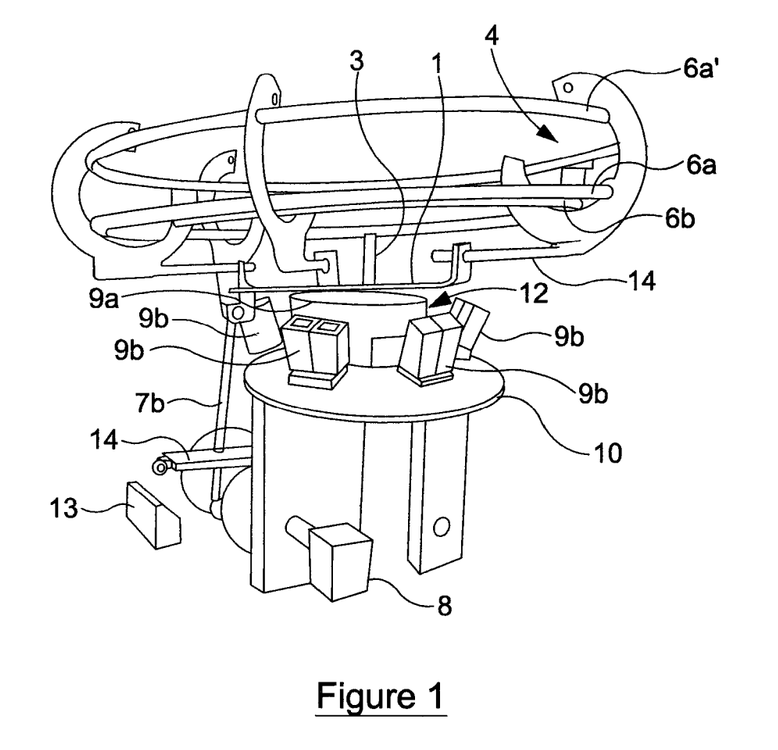
FIG. 1 is a perspective view of the system showing the circular plate supported on top of a support pillar to be able to oscillate, gyrating around the pillar and having a power transfer assembly below.
Figure 2:
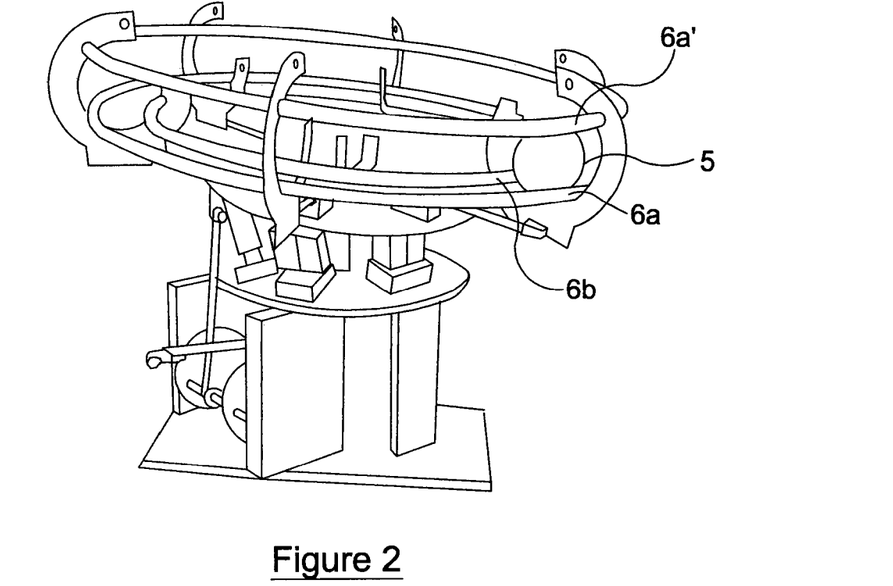
FIG. 2 is a perspective view of the system at a successive position of tilt.
Figure 3:
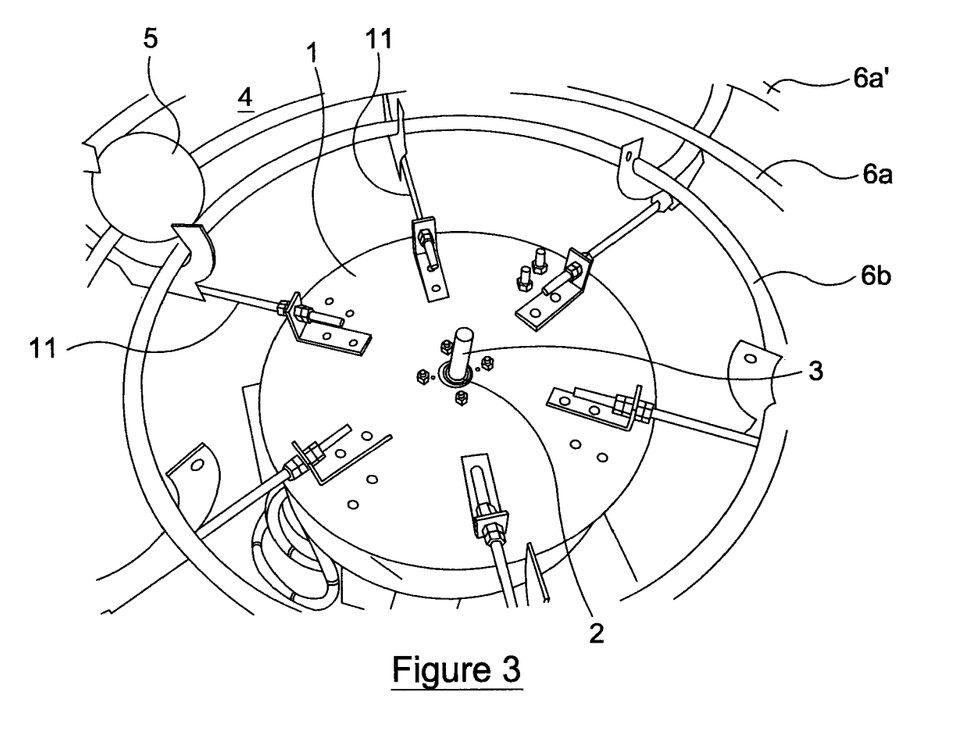
FIG. 3 is a perspective view of the system from above showing the circular track of guide rails supported by radial arms projecting from the top of the central circular support plate.
Figure 4:
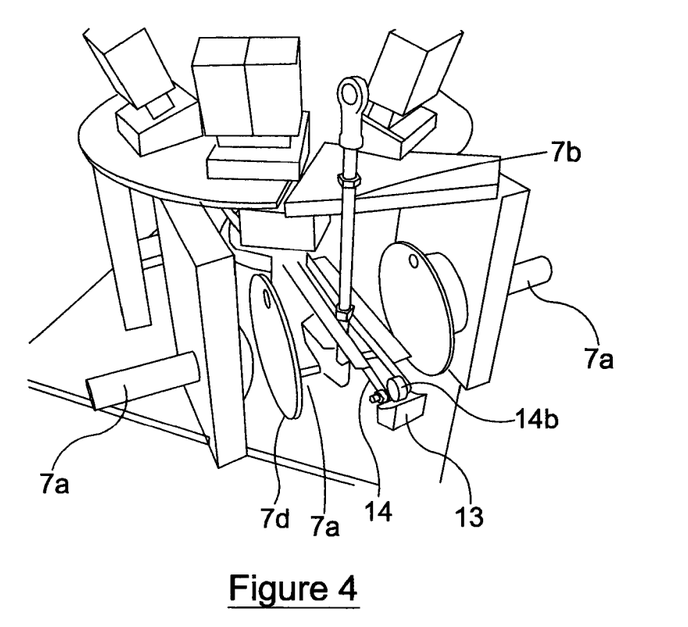
FIG. 4 is a more detailed view of the power transfer mechanism, showing the actuating arm and crank arrangement.

Referring to FIG. 1, the system illustrated comprises a circular plate 1 mounted on a universal ball joint 2 near the top of a support pillar/shaft 3. The plate 1 carries around its upper face's circumferential perimeter a circular annular track 4 for a heavy ball 5. An outer circular wall 6a and inner circular wall 6b are provided to guide/channel the ball to roll around the circular track 4. The circular track 4 is formed as a ring around the circular disk/plate 1 and is supported from the disk/plate 1 by arms 11 radiating out from the disk/plate 1 (see FIG. 5).

The circular track in FIGS. 1 to 4 is defined by three rings of steel rod, a pair of inner and outer lower guide rails/rings 6a, 6b that define the floor and sides of the track 4 and an outer upper ring 6a' that defines the upper edge of the outer track side. A further ring (not shown) may be added as an upper inner guide rail/ring to cage the ball 5 fully and prevent any risk of accidental dislodgement.

The universal ball joint 2 is formed as a sleeve around the support pillar 3. The circular disk/plate 1 of FIGS. 1 to 4 overlies a support cylinder 12 and as it gyrates with the track 4 it's lower edge, at any point in time, leans on the rim of the support cylinder 12. The support cylinder 12 in turn sits on top of a support platform 10 and the platform 10 carries the electro-magnet array 9b of the system.

The ball 5 that serves as the rolling, moving mass that moves around the track 4 in use is heavy, suitably being large and of a dense and heavy metal. In examples it weighs of the order of a kilogram or multiple kilograms, indeed it may in large scale systems weigh hundreds of kilograms. The ball 5 is selected relative to the rest of the apparatus so that as it rolls around the track 4 it continues to drive the track 4/plate 1 to oscillate/gyrate.

The plate 1 is supported by the universal ball joint 2 such as to pursue a natural oscillating, gyrating motion in use about the fulcrum axis 3 enabled by the universal ball joint 2 that mounts the plate 1 to the axis/shaft 3. The plate 1 with track 4 carried by it, is encouraged in operation to gyrate through the dropping of the free heavy ball 5 under gravity down along the down tilted section of track 4 and then rising by momentum and with brief localised tilt-inducing impulses from an electro-magnetic drive keeping the plate and track in continuous motion.

The power transfer mechanism 7 is an assembly, shown in FIG. 1 as comprising a crank shaft 7a extending horizontally and with a single crank pin or linkage 7b rising from it and attached to the underside of the plate 1 so as to follow the oscillation of the plate 1. At each opposing end of the crank shaft 7a there is a respective one of a pair of dynamo's/electrical energy generators 8 coupled by a respective gear assembly to the crank shaft 7a to convert kinetic energy from the spinning crank shaft 7a into electrical energy.

The system may have a number of crank shafts located at intervals around the track 4 each with a respective crank pin. The crank pins 7b arranged around the system are installed to the system extending down below the track 4 at an angle of incline to vertical.

Figure 5:
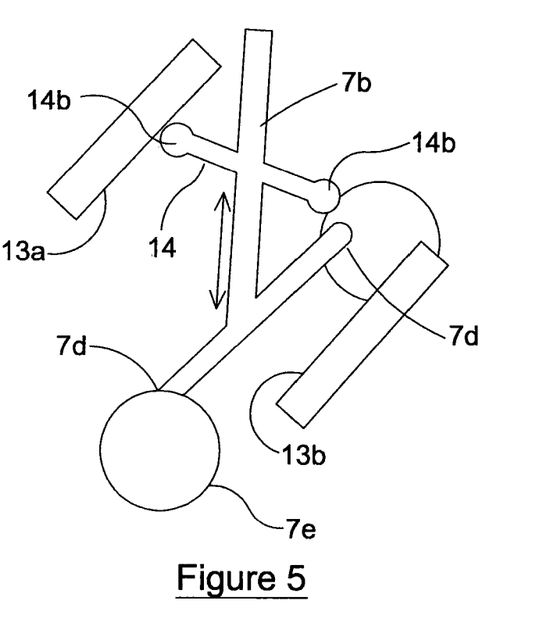
FIG. 5 is a detailed view of a pair of end-of-throw deflecting surfaces for the crank pin of the power transfer mechanism to guide the crank shaft for completing cycles of operation.

To facilitate the cycling of each crank shaft 7a a pair of end of throw guiding/deflecting surfaces 13 is provided as illustrated in FIG. 5. One of the pair of surfaces is an upper deflecting surface 13a that is positioned at an upper location alongside the crank pin and inclined facing downwardly to deflect the crank pin 7b to guide it to move downwardly from its upper extremity. The other is a lower deflecting surface 13b that is positioned at a lower location alongside the crank pin and inclined facing upwardly to deflect the crank pin 7b to move upwardly from its lower extremity. Contact of the crank pin 1b with each deflecting surface is made via a transverse bar 14 that is provided fixed on the crank pin 7b extending laterally/substantially radially outwardly from the crank pin 7b to front and rear. At each outer end of the transverse bar 14 is a respective bearing 14b, suitably a ball bearing or roller bearing, that follows the adjacent deflecting surface 13 to deflect the crank pin 7b so that the point 7c of the crank shaft 7a to which the crank pin 7b is attached can overcome kinematic lock and more readily pass over the respective upper and lower apex of its turning circle on the crank wheel 7d.

The oscillating (ie switching on-off cyclically or periodically) electromagnetic drive 9 that is provided to ensure efficient continuous gyration of the track 4 and operation of the system is here exemplified as comprising an array of permanent magnets 9a arranged in a ring on the underside of the circular plate 1 following the circumferential perimeter of the plate 1 and a corresponding circle array of electro magnets 9b on the horizontal platform 10 below the plate 1 at a level substantially corresponding to just below a lowermost point of travel of the track 4. During the gyrations the electromagnet does not contact the circular plate 1 or the permanent magnets 9a, but approaches close.

As the ball 5 travels along the guide rails 8a, 6b of the track 4 around the edge of the oscillating plate 1 a first length of the plate 1 edge will be in a fully lowered state and an opposite edge length of the plate 1 will be in a fully raised state, and after 180 degrees of the ball travelling the states will have been switched with the first length of the plate 1 edge now in fully raised state, the next 180 degrees will complete the cycle.

Motion of the gravity ball can be initiated by the electromagnetic drive 9. The circular array of permanent magnets 9a and the circular array of electromagnets 9b are strategically positioned relative to each other to be able to attract one another just ahead of the ball wherever the track 4 is at in its gyration circle, and the intensity of the attraction between the two magnets and speed can be controlled and determined with a control arrangement that suitably comprise two potentiometers. Suitably only one co-operating electro-magnet/magnet pair is operating at a time, with each successive electromagnet in the circular array being successively briefly switched on to apply a downward tilting force to the plate at that point.

In variant embodiments the electro-magnets may induce localised magnetism in the track 4 or its associated circular plate 1 or other linked extension of the track 4 and not require multiple discrete magnets or elements. Indeed, the electro-magnets could be positioned on the track or its extension rather than on the horizontal platform 10.

The magnetic attraction tilts the plate downwards just ahead of the ball 5 and drives the ball forwards down the natural downward slope, with the plate 1 and associated track 4 continuing to gyrate around the central support axis. Relatively low energy input is required to move and maintain movement of the exceptionally heavy ball 5 yet leading to a substantial gravitational force as the ball 5 accelerates downwards which in turn allows for a substantial amount of energy that may be harnessed through the electrical generators 8a, 8b.

In FIG. 1 there is one generator 8 attached to one crank shaft 5a. This may be augmented by a further crank shaft on the underside of the oscillating plate, suitably parallel to the first crank shaft 7a, and with a generator at each end thereby increasing the total number of electrical generators to four. Furthermore, to straightforwardly increase the total number of generators to eight if desired, the upper side of the oscillating plate 1 may be equipped with a mirror image of the lower power transfer assembly. The upper side of the oscillating plate 1 may be equipped with a pair of crank shafts 7a too, each with a generator 8a, 8b at each respective end. Total output from the generators will in part be determined by the size of the oscillating plate 1 and the weight of the ball. Using the above described embodiment and the embodiments described below a weight of 350 kg can be readily gyrated with light force applied even by just one finger pressing down and via the generators can generate a considerable amount of electrical energy.

Figure 6:
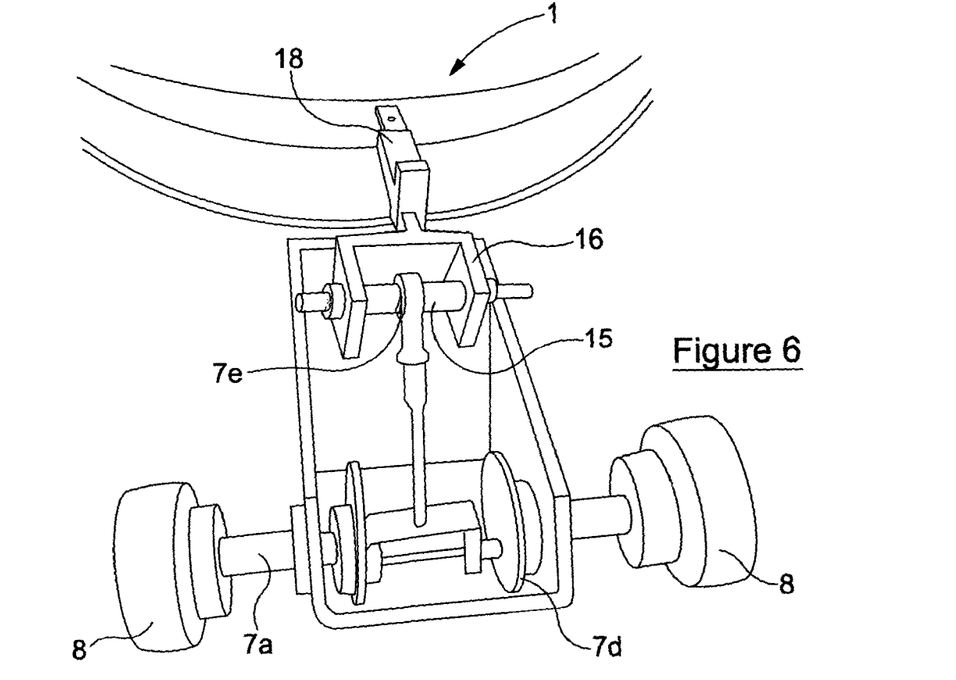
FIG. 6 is a detailed perspective view of a form of the FIG. 4 power transfer mechanism, in which the crank pin articulation to the oscillating plate comprises a cradle with a transverse shaft.
Figure 7:
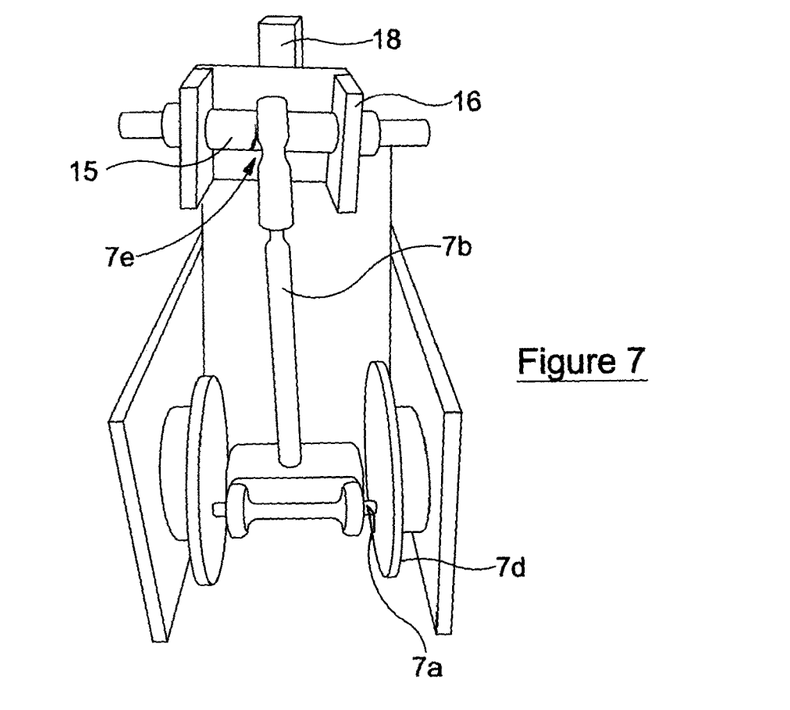
FIG. 7 is a further detailed perspective view of the FIG. 6 power transfer mechanism.
Figure 8:
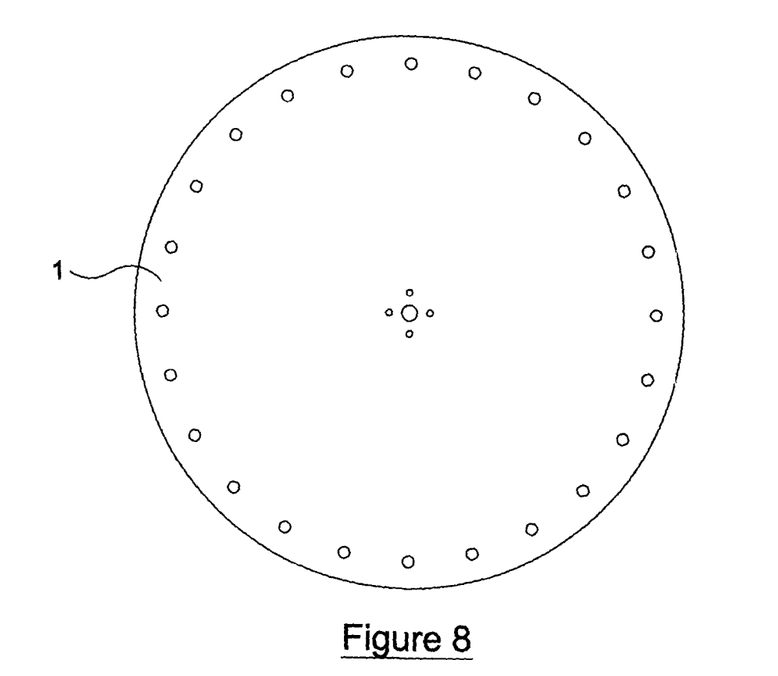
FIG. 8 is a plan view of a circular oscillating plate/disc of the system.
Figure 9:
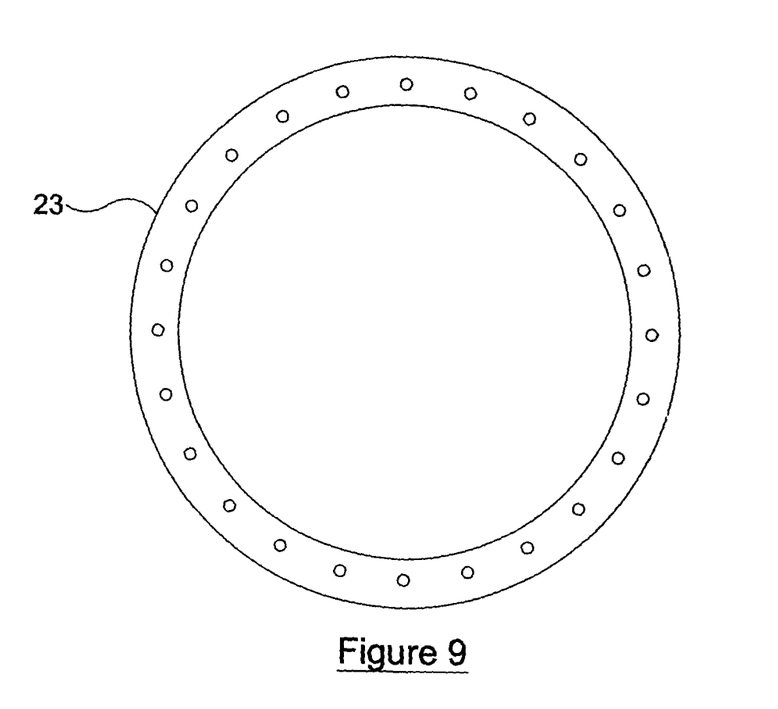
FIG. 9 is a plan view of an outer support bearing ring of a slew bearing assembly for a weighted flange plate.
Figure 10:
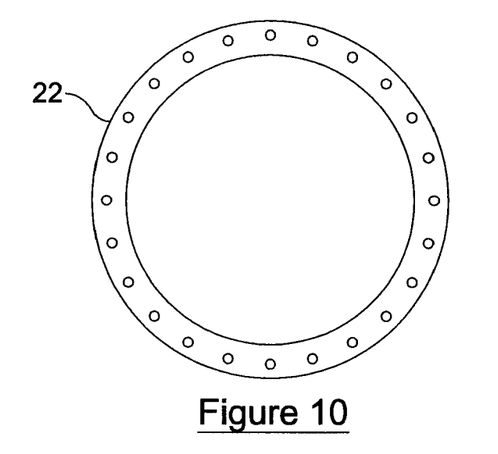
FIG. 10 is a plan view of an inner support/bearing ring of a slew bearing assembly.
Figure 11:
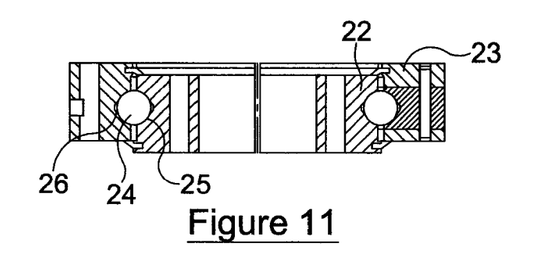
FIG. 11 is a figurative/not to scale sectional view of the slew bearing assembly with the outer support/bearing ring and inner support/bearing ring assembled together.

Referring to FIGS. 6 and 7 here the crank shaft 7a has a generator 8 at each end. The crank pin 7b has at its upper end a 'rod end bearing' 7e that swivel couples the crank pin 7 upper end to an upper transverse/substantially horizontal shaft 15. The transverse shaft 15 is held in a U-shaped cradle 16 with a plain bearing mount of the shaft 15 to the cradle 16 at each end. The cradle 16 is itself rigidly attached to the oscillating plate 1 by an arm assembly 18 projecting from the oscillating plate 1 so that the cradle moves with the same motion as that part of the plate 1 as the plate 1 oscillates/gyrates. The rod end bearing 7e is a special bearing that accommodates for not only rotary swivelling motion but also relative slewing/tilting of the axis of the shaft 15 as the shaft 15 moves with the movement of oscillating plate 1. In a practical embodiment the rod end bearing 7e may accommodate tilting of the shaft 15 by up to 60 degrees relative to the horizontal plane.

Figure 12:
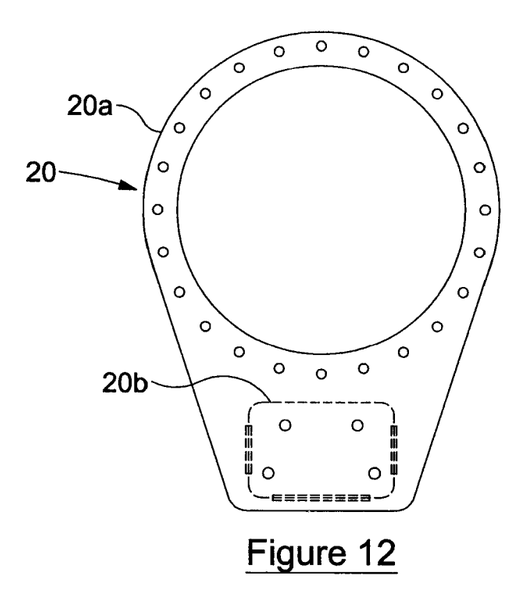
FIG. 12 is a plan view of the flange plate.
Figure 13:
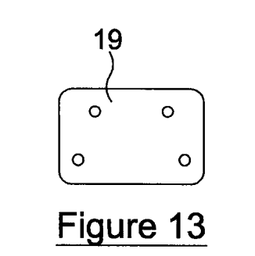
FIG. 13 is an end plan view of the pocket for the weight of the flange plate.
Figure 14:
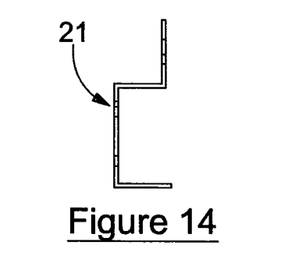
FIG. 14 is a plan view of a weight plate for the flange plate.

Referring to FIGS. 8 to 14, these illustrate an alternative to the rolling ball and track with guide rails of the first embodiment. Here instead the moving mass is a weight plate 19 that is mounted to an annular flange 20 that surrounds the central/fulcrum axis 3. The flange plate 20, as shown in FIG. 12, is a flat plate that has a circular annular inner part 20a and an eccentric lobe part 20b extending radially outwardly from the annular inner part 20a to the perimeter of the apparatus. The weight plate 19 is held in a pocket 21 that is bolted on the eccentric lobe part 20b of the flange plate 20 and is demountable and replaceable with a heavier or lighter weight plate 19 or with addition or removal of numbers of weights.

The eccentrically weighted flange plate 19 is bolted to an inner support/bearing ring 22 (shown in FIG. 10) that is engagingly fitted in use concentrically within an outer support/bearing ring 23. The outer support/bearing ring 23 is bolted down onto the oscillating plate/disc 1. The inner support/bearing ring 22 and outer support/bearing ring 23 are coupled together by ball bearings 24 that sit in and roll around an outer circumferential groove 25 in the inner support/bearing ring 22 and an inner circumferential groove 26 in the outer support/bearing ring 23 (see FIG. 11). The ball bearings have freedom to slew as they roll along the grooves. Together these form a giant slewing bearing assembly whereby the eccentric weight 19 is free to move and promote gyrating movement of the oscillating plate/disc 1. In variations to this arrangement the bearing assembly may comprise a triple roller slewing bearing (if either ring is held the other can rotate); and/or tapered roller bearing assembly or be a normal slewing ball bearing assembly. Normal ball bearings suit use where the whole assembly is relatively modest in size, but as the apparatus increases in scale the use of triple or tapered roller bearings is preferred.

Figure 15:
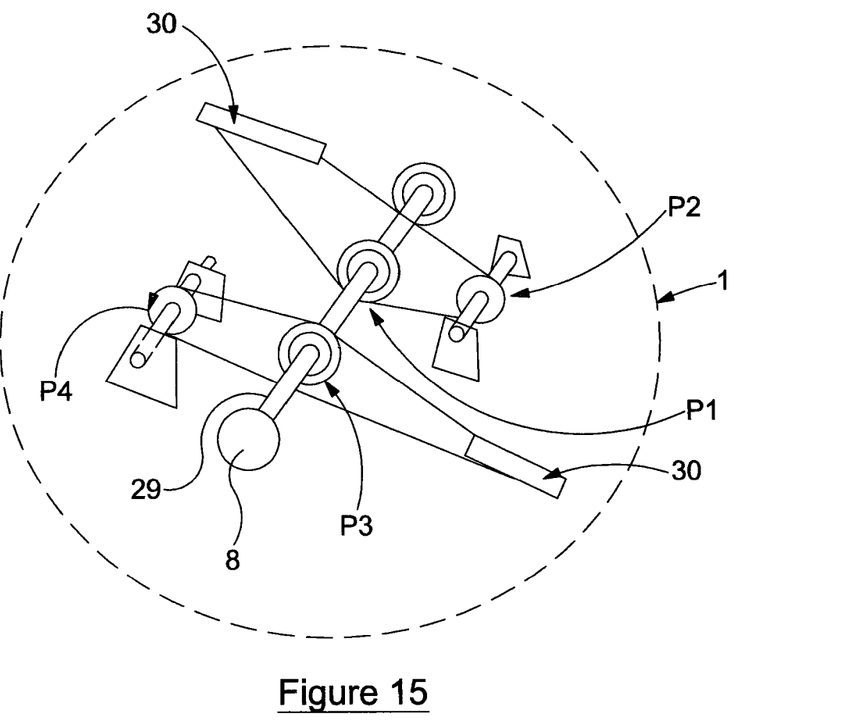
FIG. 15 is a schematic perspective view of a belt and pulley power take off system that couples to the underside of the oscillating plate.

Referring to FIG. 15, this illustrates a different power transfer/power take-off assembly to that shown in FIGS. 1 to 7. This power transfer assembly uses a pair of timing belts 27, 28 and pulleys P1-P4 for transmission of motion from the oscillation movement of the disc to the generator/turbine shaft 29. Each timing belt 27, 28 is anchored to the oscillating plate/disc 1 at an opposing side of the fulcrum axis 3 to the other at a respective housing/bracket 30. The belts 27, 28 alternate in pulling and turning a pulley/gear wheel on a generator shaft 29 as their side of the plate/disc 1 rises. Each timing belt 27, 28 passes around a respective stationary/ground mounted pulley P2 or P4 and around a respective pulley P1 or P3 on the generator shaft 29. As the oscillating plate/disc 1 tilts it pulls one belt 27, driving the shaft 29 and as the position alternates the first pulley P1 goes to neutral state and the second pulley P2 takes over, then the second one goes to neutral state and first one engages. Belts 27, 28 suitably have contact with pulleys at all times and engage and disengage like a sprocket (like as in a bicycle).

In yet other embodiments the generator may be a linear alternator/linear reciprocating electrical generator. In such cases the power transfer mechanism need not comprise a crank shaft and the electrical generator may be at/coupled to a said pin, connecting rod, linkage or piston, preferably at an end of the pin, connecting rod, linkage or piston.

Figure 16:
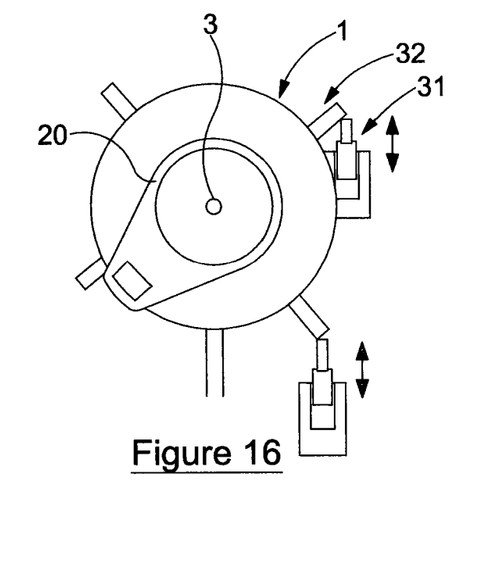
FIG. 16 is a schematic plan view of a contacting actuator drive system for giving nudges to the oscillating plate for oscillation/gyration.

Referring to FIG. 16 this illustrates schematically a different drive assembly to that shown in FIGS. 1 to 15. Here the oscillating plate 1 is initiated moving and impulsed by a contacting actuator drive system that gives nudges to the osculating plate 1 for oscillation/gyration. This comprises a suitable number of pushers or pullers at the perimeter of the oscillating plate 1. In the illustration there are two pistons/pushers 31 shown that alternately push their adjacent part of the plate 1 edge upwardly. The pistons/pushers 31 may be hydraulic, pneumatic and/or electric motor driven and they are shown as acting against radial extension arms 32. The drive assembly may have 2, 3, 4 or more pistons/pushers 31 suitably at substantially equi-distant spacings around the perimeter. The two or more actuators 31 may be attached to the plate 1 for pushing or pulling the plate/disc 1 up or down and are suitably controlled according to the position of the weight.

The actuators 31 are suitably controlled with sensors that monitor the state of the oscillating plate 1 so that impulse is applied efficiently as required.

In one arrangement for gyrational driving of the oscillating plate 1 a four, five or six degrees of freedom underlying supportive bearing mount may be used with motor control of each degree of freedom of movement. An example of this is the hexapod support with parallel kinematics that is used for mounting some telescopes and as an adjustable support bed for precision manufacturing.

Figure 17:
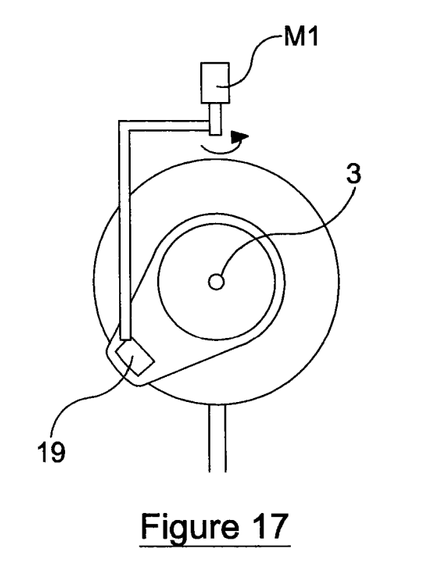
FIG. 17 is a schematic plan view of a rotary contacting actuator drive system for giving nudges to the weight/eccentric lobe of the eccentric-weighted oscillating plate for oscillation/gyration.

Referring to FIG. 17, this illustrates schematically a further different drive assembly to those shown in FIGS. 1 to 15 and 16. Here the oscillating plate 1 is initiated moving and kept moving by a rotary contacting actuator drive system which gives nudges/light rotary pushing or pulling to the weight/eccentric lobe of the eccentric-weighted oscillating plate for oscillation/gyration. The rotary actuator shown is driven with an electric motor M1 mounted directly above the fulcrum axis 3 and it has a radiating arm 32 that is extended down to the weight 19 on the flange for pushing or pulling the weight around the disc.

The invention is not limited to the embodiments above-described and features of any of the embodiments may be employed separately or in combination with features of the same or a different embodiment and all combinations of features to produce a gravity oscillating system within the spirit and scope of the invention.

What is claimed is:

1. A gravity oscillating system which comprises a looped track around which a moving mass travels freely in use, the track being supported from above or below to oscillate up and down as the moving mass travels around the track, and there being a power transfer mechanism linked to the track to be moved by the track as the track oscillates, the power transfer mechanism being linked to an electrical generator/dynamo whereby the movement is used to generate electrical energy and wherein the system has an oscillating electromagnetic drive comprising a plurality of electromagnets in an array around the track and which are successively momentarily energized to urge each successive part of the track around the track in a direction, upwards or downwards, to cause the track to dip down ahead of the moving mass, without the drive contacting the track.

2. A system as claimed in claim 1, wherein the energized electro-magnet urges a part of the track downwardly ahead of the rolling mass running around the track.

3. A system as claimed in claim 1, wherein the energized electromagnet attracts a counter-part magnet or magnetisable element on the track or on an extension of the track and pulls that part of the track downwardly.

4. A system as claimed in claim 3, wherein the counterpart magnet or magnetisable element is one of a plurality of counterpart magnets or magnetisable elements provided in an array around the track on the track or on an extension of the track.

5. A system as claimed in claim 1, wherein the system comprises a controller configured whereby operation of the electromagnet is subject to automated control whereby the electromagnet is on for a brief period or pulse to assist movement of the track around to the region of influence of the next successive electromagnet in the array before that next electromagnet is switched on for a brief period instead and so on.

6. A system as claimed in claim 5, wherein the controller comprises an arrangement of micro-switches for the automated control of the electromagnets.

7. A system as claimed in claim 5, wherein the controller comprises a control processor.

8. A system as claimed in claim 7, wherein the controller comprises sensors to sense position of the track and/or ball and/or sense rate of oscillation or gyration.

9. A system as claimed in claim 1, wherein the power transfer mechanism comprises at least one crank pin, connecting rod, linkage or piston that touches a surface of the track or touches or attaches to a surface extending from the track to follow the downwards motion of the track as the track oscillates or gyrates.

10. A system as claimed in claim 9, wherein the crank pin, connecting rod, linkage or piston is attached to said surface.

11. A system as claimed in claim 10, the system further comprises an end of throw deflector for the at least one crank pin, linkage or piston and which is configured to guide the crank pin, linkage or piston to move beyond an extreme position to complete a cycle of operation.

12. A system as claimed in claim 11, wherein the end of throw deflector is a deflecting surface that is inclined to the vertical plane.

13. A system as claimed in claim 11, wherein a transverse projection extends laterally/substantially radially outwardly from the crank pin, linkage or piston to co-operate with the end of throw deflecting surface.

14. A system as claimed in claim 12, wherein the system has an end of throw deflector for the lower end of the crank pin, linkage or piston movement.

15. A system as claimed in claim 12, wherein the system has an end of throw deflector for the upper end of the crank pin, linkage or piston movement.

16. A system as claimed in claim 13, wherein the end of flow deflector is a deflecting surface and the transverse projection incorporates a rolling bearing to follow the end of throw deflecting surface.

17. A system as claimed in claim 1 wherein the system has a linear alternator/linear reciprocating electrical generator.

18. A system as claimed in claim 17, wherein the electrical generator is at/coupled to a pin, connecting rod, linkage or piston.

19. A system as claimed in claim 9 wherein the crank pin has at its upper end a rod end bearing that swivel couples the crank pin upper end to an upper transverse shaft.

20. A system as claimed in claim 19 wherein the transverse shaft is held in a cradle that is itself rigidly attached to the oscillating track so that the cradle moves with the track as the track oscillates/gyrates.

21. A system as claimed in claim 1 wherein the moving mass is a rolling ball and the track has a guide wall or guide rail for the ball.

22. A system as claimed in claim 1, wherein the moving mass is an eccentrically weighted plate or body with an annulus that is mounted around a central axis about which the plate or body oscillates/gyrates.

23. A system as claimed in claim 1 having a power transfer/power take-off assembly that comprises belts and pulleys for transmission of motion from oscillation movement of the track to a generator/turbine shaft.

* * * * *